Feb. 8, 1927.
R. G. MAXWELL
1,616,817
EGG BEATER
Filed May 3, 1926
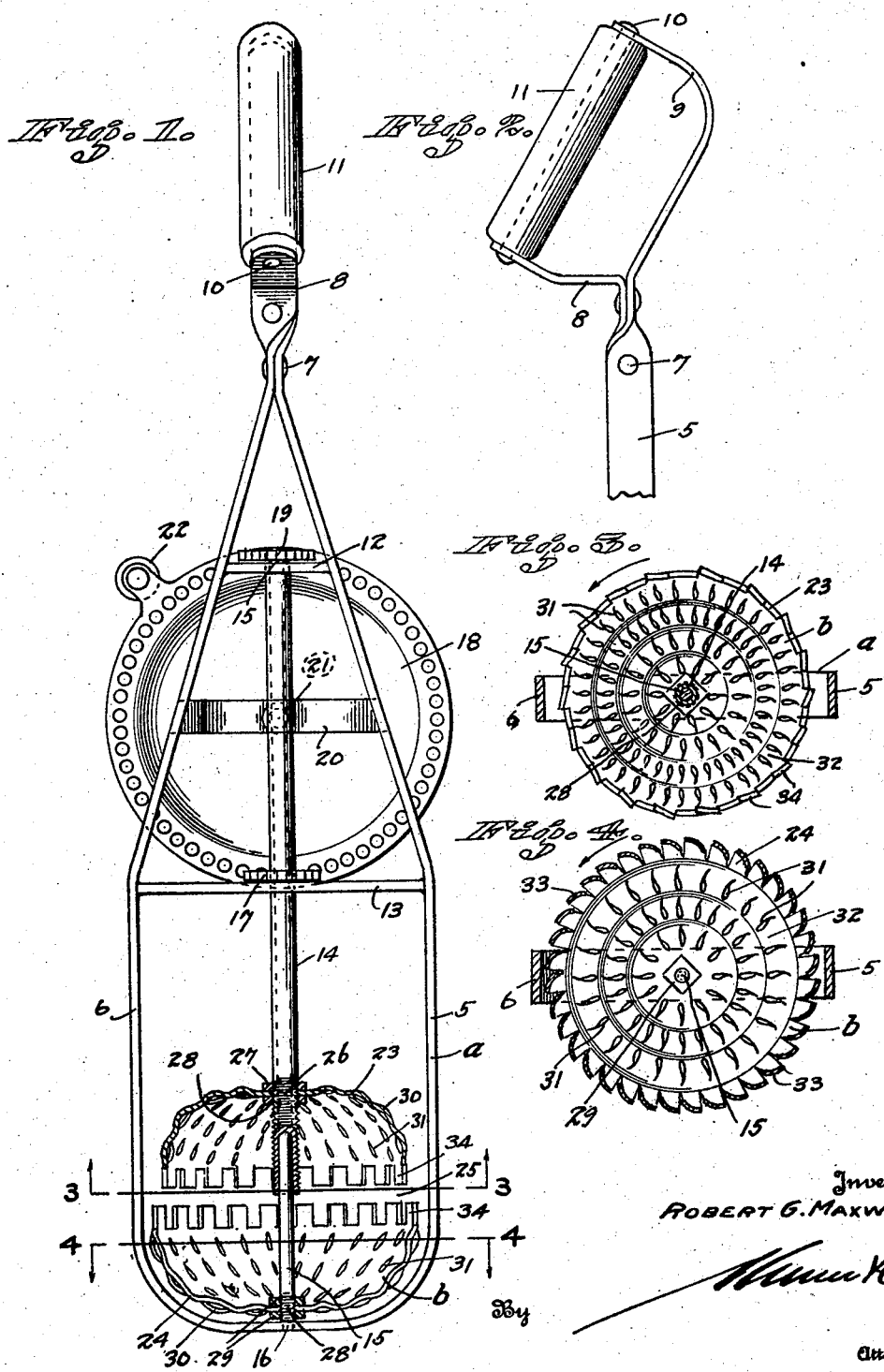
Inventor
ROBERT G. MAXWELL
Attorneys.

Patented Feb. 8, 1927.

1,616,817

UNITED STATES PATENT OFFICE.

ROBERT G. MAXWELL, OF OAKLAND, CALIFORNIA.

EGG BEATER.

Application filed May 3, 1926. Serial No. 106,484.

The present invention relates to stirring and mixing devices, and has particular reference to devices of this kind employed for stirring and mixing food stuffs for general domestic use.

In the mixing or beating of eggs, sauces and the like, the ordinary mixing device is provided with a rotary dasher or propeller and this operates to move the liquid material upwardly so that frequently, and especially when the dasher is operated at a high speed, the liquid material overflows.

The general object of the present invention is to provide for mixing liquid and semi-liquid material, and operating the same within the mixing bowl to move upwardly for a predetermined distance and then downwardly and, finally, outwardly and into the bowl, with the result that the material will not, unduly, rise within the bowl and overflowing and splashing are prevented.

The above and other objects are accomplished by instrumentalities pointed out in the following specification.

The invention is clearly defined in the claims.

A satisfactory embodiment of the invention is illustrated in the accompanying drawings forming part of the specification and in which—

Figure 1 is a side elevation of the present invention with parts thereof broken away to disclose the construction and relation of other parts.

Figure 2 is a side elevation of the upper end portion of the frame of the device showing a handle and viewed at right angles to Figure 1.

Figure 3 is a detail cross-section on the line 3—3 of Figure 1, and looking in the direction of the arrows, and Figure 4 is a view similar to Figure 3 and taken on the line 4—4 of Figure 1, looking in the direction of the arrows.

*a* indicates a supporting frame formed in any suitable manner and of any desired material, such as flat sheet metal bent so as to provide opposite side portions 5 and 6 which converge and are united at one end portion by a rivet 7 and attached to the shank 8 of a yoke 9 which is offset so as to extend obliquely to frame *a*. The arms of the yoke are connected by a spindle 10 upon which is mounted a handhold of wood or the like 11. The offsetting of the handle structure just described from the frame permits of maintaining the frame in the vertical within a mixing bowl without requiring undue bending of the arm of the operator.

12 is a cross piece disposed between the sides 5 and 6 adjacent to the upper end portion of the frame, and 13 is a second cross piece disposed at the middle portion of the frame and below cross piece 12. These cross pieces are secured in any preferred manner as by spot welding to the sides 5 and 6 and operate to brace the same against lateral bending. The lower cross piece is centrally provided with a bearing in the form of an opening for a tubular shaft 14 which extends longitudinally of frame *a*, and the cross piece 12 is centrally provided with an opening which provides a bearing for shaft 15 which extends through shaft 14. The lower end of shaft 15 is mounted in a bearing in the lower end of frame *a*, as indicated by 16. Shaft 14 terminates for a distance appreciably above the lower end of the frame. 17 is a pinion fixedly secured to tubular shaft 14 and meshing with a gear wheel 18 of any well known construction. 19 is a pinion at the upper end of shaft 15 and meshing with gear wheel 18, at a point diametrically opposite to pinion 17. A cross piece 20 is disposed between the cross pieces 13 and 14 and is provided with a laterally extending spindle 21 which forms a bearing for gear wheel 18 and the latter is provided with an operating handle 22 which serves as a finger hold in manipulating gear wheel 18 to turn.

Obviously with this construction and when gear wheel 18 is rotated, shafts 14 and 15 will likewise be rotated, but shaft 14 will turn in a direction opposite from shaft 15. The dasher or propeller *b* is made up of two sections respectively indicated by 23 and 24. These sections are arranged one above the other, the upper being connected to tubular shaft 14 and the lower connected to shaft 15, the connection between the sections and the shafts being such that the sections rotate with the shafts. Sections 23 and 24 are of metal and each is substantially hollow hemispherical in contour. The sections are so disposed that their concave or inner faces are opposed and a relatively narrow space, as indicated by 25, exists between the adjacent edges of the sections. Tubular shaft 14 extends through an axial opening in section 23, and a screw threaded portion 26 upon said shaft is disposed within the opening in the section and is provided for suitable fastening devices, such as nuts 27 and 28, which operate to clamp the section 23 therebetween. A screw threaded portion 28' extends through an axial opening in section 24 and the section 24 is clamped by nuts 29. Each of the sections 23 and 24 is provided with a plurality of concentrically disposed corrugations 30. The corrugations are circular and in each a circular series of transverse openings 31 are formed.

The intervening portions 32 between the openings pitch or slope inwardly from the edge of one opening to the adjacent edge of the next opening, as indicated by 33 in Figure 4. This pitch or slope of the intervening portions 32 has the effect of moving liquid or semi-liquid material in a direction substantially axially of the shafts 14 and 15, the construction being such that the inner edges of the intervening portions forming one side of the openings extend upwardly with respect to the lower section 24, while the corresponding edges of the openings of the portions 32 of the upper sections 23 extend substantially downward. With this construction and when the agitator is rotated so that the inner edges of the intervening portions 32 act as trailing edges, the liquid material located within the dasher is moved substantially axial of the shafts 14 and 15 in the rotation of the sections of the dasher.

The opposed edges of the sections 23 and 24 are notched so as to provide blades 34 which extend substantially perpendicular. These blades are pitched, as indicated in Figures 1 and 3, so that in the rotation of the sections 23 and 24, the blades will operate to move liquid outwardly and substantially at right angles to the shafts 14 and 15.

In the use of the device and when the lower end of the frame and the dasher b are inserted into the material to be stirred or mixed, the rotation of the sections 23 and 24 operate to break up and disintegrate any definitely formed soft matter, such as the yolks of eggs, this operation of breaking being performed by the outer edges of the portions 32. The material upon moving through the openings 31 and into the lower section 24 moves upwardly while the material moving into the upper section 23 is thrown downwardly so that within the dasher the material is thrown violently back and forth until the action of the blades 34 operates to move the material laterally outward and through the space 25. This action on the part of the device operates to effect the thorough mixing of food stuffs or the breaking up and mixing of eggs with great rapidity, and the action of the sections 24 and 25 upon the material disposed exteriorly of the dasher by operating to draw this material into the dasher and then move the same outwardly therethrough prevents the material from rising above the upper section 23 so that splashing or undue rising of the material within the mixing bowl is effectively prevented.

Although I have shown and described one embodiment of my invention, it is to be understood that the same is susceptible of various changes; and I reserve the right to employ such as may come within the scope of the appended claims.

I claim:

1. A device of the class described comprising a supporting frame, concentrically disposed and oppositely rotatable shafts mounted upon said frame, means for rotating said shafts and an agitator comprising hollow hemispherical sections secured to said shafts and arranged in spaced relation thereon, said sections being oppositely rotatable with the shafts and adapted for moving liquid material in opposed directions axially of the shafts and outwardly and at right angles to the shafts.

2. A device of the class described comprising a supporting frame, concentrically disposed and oppositely rotatable shafts mounted upon said frame, means for rotating said shafts, and an agitator comprising hollow hemispherical sections secured in spaced relation upon said shafts and disposed with their concave surfaces in opposed relation, said sections being oppositely rotatable with the shafts and each provided with a series of transverse openings and bent portions intermediate said openings for moving liquid material in opposed directions axially of the shaft.

3. A device of the class described comprising a supporting frame, concentrically disposed and oppositely rotatable shafts mounted upon said frame, means for rotating said shafts, and an agitator comprising hollow hemispherical sections secured in spaced relation upon said shafts and disposed with their concave surfaces in opposed relation, said sections being oppositely rotatable with the shafts and each provided with a series of transverse openings and bent portions intermediate said openings and peripheral blades adapted for moving liquid material in opposed directions axially of the shafts and outwardly and at right angles to the shafts.

4. A device of the class described comprising a supporting frame, concentrically disposed and oppositely rotatable shafts mounted upon said frame, means for rotating said shafts, and an agitator comprising hollow heimspherical sections secured in spaced relation upon said shafts and disposed with their concave surfaces in opposed relation, said sections being oppositely rotatable with the shafts and each provided with a plurality of concentrically disposed corrugations each of which is provided with a series of transverse openings and bent portions intermediate said openings for moving liquid material in opposed directions axially of the shaft.

5. A device of the class described comprising a supporting frame, concentrically disposed and oppositely rotatable shafts mounted upon said frame, means for rotating said shafts, and an agitator comprising hollow hemispherical sections secured in spaced relation upon said shafts and disposed with their concave surfaces in opposed relation, said sections being oppositely rotatable with the shafts and each provided with a plurality of concentrically disposed corrugations each of which is provided with a series of transverse openings and bent portions intermediate said openings, together with a plurality of peripherally disposed blades and adapted for moving liquid material in opposed directions axially of the shafts and outwardly and at right angles to the shafts.

ROBERT G. MAXWELL.